(12) United States Patent
Miao et al.

(10) Patent No.: US 9,889,474 B2
(45) Date of Patent: Feb. 13, 2018

(54) SPRAYING DEVICE AND USE THEREOF

(71) Applicant: Tianhe (Baotou) Advanced Tech Magnet Co., Ltd., Baotou (CN)

(72) Inventors: Juchang Miao, Baotou (CN); Yong Zhai, Baotou (CN); Jianxin Ma, Baotou (CN); Enfeng Gao, Baotou (CN); Yanling Song, Baotou (CN); Shulin Diao, Baotou (CN); Yi Dong, Baotou (CN); Haibo Yi, Baotou (CN); Shujie Wu, Baotou (CN); Yi Yuan, Baotou (CN); Ya Chen, Baotou (CN); Wenjie Yuan, Baotou (CN)

(73) Assignee: Tianhe (Baotou) Advanced Tech Magnet Co., Ltd. (CN)

( * ) Notice: Subject to any disclaimer, the term of this patent is extended or adjusted under 35 U.S.C. 154(b) by 34 days.

(21) Appl. No.: 15/059,736

(22) Filed: Mar. 3, 2016

(65) Prior Publication Data

US 2017/0050222 A1 Feb. 23, 2017

(30) Foreign Application Priority Data

Aug. 20, 2015 (CN) .......................... 2015 1 0514590

(51) Int. Cl.
*B05B 13/02* (2006.01)
*B05B 15/04* (2006.01)
(Continued)

(52) U.S. Cl.
CPC .................. *B08B 3/00* (2013.01); *B05B 3/00* (2013.01); *B05B 7/0807* (2013.01);
(Continued)

(58) Field of Classification Search
USPC .... 118/70, 313–315, 323, 324, 326, 58, 712
See application file for complete search history.

(56) References Cited

U.S. PATENT DOCUMENTS 3,111,430 A * 11/1963 Graf .................... B05B 13/0221
118/323
4,860,883 A * 8/1989 Knaul .................... B65G 45/22
198/495
(Continued)

FOREIGN PATENT DOCUMENTS

CN 101845637 A 9/2010
CN 102181820 A 9/2011
(Continued)

*Primary Examiner* — Yewebdar T Tadesse
(74) *Attorney, Agent, or Firm* — Lerner, David, Littenberg, Krumholz & Mentlik, LLP

(57) ABSTRACT

A spraying device comprises: a conveyer comprising a mesh crawler belt configured to carry an object to be sprayed; a baking chamber for heating the object to be sprayed; a spraying chamber having at least one atomizing nozzle disposed within the spraying chamber, the atomizing nozzle being configured to uniformly spray a coating solution on a surface of the object to be sprayed; a cleaning chamber for cleaning the mesh crawler belt and recycling the coating solution carried by the mesh crawler belt; and a solution storage apparatus for storing the coating solution that the spraying chamber needs for spraying; wherein the mesh crawler belt passes successively through the baking chamber, the spraying chamber and the cleaning chamber. The device of the present invention can ensure uniformity of the thickness of a coating layer on the magnet. In addition, the device can improve spraying efficiency and save raw material.

8 Claims, 3 Drawing Sheets

(51) Int. Cl.
  *B05B 7/06* (2006.01)
  *B08B 3/00* (2006.01)
  *B05B 7/08* (2006.01)
  *B05B 3/00* (2006.01)
  *B05B 13/04* (2006.01)
  *H01F 1/057* (2006.01)
  *B05B 15/00* (2006.01)
  *B05D 1/02* (2006.01)
  *B05D 3/02* (2006.01)
  *B05B 15/02* (2006.01)
  *B65G 45/22* (2006.01)

(52) U.S. Cl.
  CPC ...... *B05B 13/0221* (2013.01); *B05B 13/0478* (2013.01); *B05B 15/00* (2013.01); *B05B 15/0418* (2013.01); *B05B 15/0425* (2013.01); *B05D 1/02* (2013.01); *B05D 3/0218* (2013.01); *H01F 1/0575* (2013.01); *B05B 15/003* (2013.01); *B05B 15/025* (2013.01); *B05D 2252/10* (2013.01); *B05D 2258/02* (2013.01); *B65G 45/22* (2013.01); *Y02P 70/36* (2015.11)

(56) References Cited

U.S. PATENT DOCUMENTS 5,597,414 A * 1/1997 Potthoff .............. B05B 15/0406
  118/17
2007/0193056 A1* 8/2007 Switalski ................ F26B 15/18
  34/88

FOREIGN PATENT DOCUMENTS

| CN | 103839670 A | 6/2014 |
| CN | 104134528 A | 11/2014 |
| CN | 104388952 A | 3/2015 |

* cited by examiner

SPRAYING DEVICE AND USE THEREOF

CROSS-REFERENCE TO RELATED APPLICATIONS

The present application claims priority from Chinese Patent Application No. 201510514590.4, filed Aug. 20, 2015, the disclosure of which is hereby incorporated herein by reference.

TECHNICAL FIELD OF THE INVENTION

The present invention relates to a spraying device and use thereof, and in particular, to a self-cleaning continuous spraying device for coating a neodymium-iron-boron (Nd-FeB) permanent magnet with heavy rare-earth fluoride before infiltration of Dysprosium and Terbium on the permanent magnet at high temperature, and to the use thereof.

BACKGROUND OF THE INVENTION

Surface infiltration of Dysprosium and Terbium is a new technology for surface layer treatment after a high performance NdFeB rare earth permanent magnet is sintered into a blank. Through infiltration of Dysprosium and Terbium into a depth range of 2-3 millimeters from the surface layer of the magnet, the thermal resistance and coercive force of the magnet can be prominently improved. Therefore, such an infiltration technology has been preliminarily applied in the field of manufacturing a high performance NdFeB rare earth permanent magnet.

Dysprosium fluoride or Terbium fluoride must be uniformly coated on the surface of the magnet before the surface infiltration of Dysprosium and Terbium. Thickness and uniformity of a coating layer affect the quality of subsequent Dysprosium and Terbium infiltration. If the coating layer is too thin, the infiltration layer will be not deep enough after the infiltration of Dysprosium and Terbium; if the coating layer is too thick, it will be a waste of material; and if the thickness of the coating layer is not uniform, each region of the magnet will have different behaviors after the infiltration.

When infiltration is performed on a magnet in vacuum at high temperature, a good adhesive force between a coating material and the magnet is needed. At present, an immersion method is a commonly used method for coating the magnet. For example, CN101845637A discloses a processing technology of modifying the sintered NdFeB magnet alloy, comprising the steps of: dissolving powder of a heavy rare-earth oxide or fluoride with an appropriate weight into an acid solvent with a proper concentration; taking out and baking the magnet after the magnet is immersed in the acid solvent for an appropriate time, then a magnet surface being covered with a thin layer of heavy rare-earth powder; and placing the magnet in an argon furnace first, performing an heat diffusion treatment, and then performing an annealing treatment. As another example, CN102181820A discloses a method for improving coercive force of NdFeB magnet material, comprising the steps of: a. firstly, preparing a mixture of rare-earth fluoride powder and anhydrous ethanol; b. coating the surface of the NdFeB magnet material with said mixture through immersion; c. placing the NdFeB magnet material of which the surface is coated with said mixture in a vacuum heating furnace and performing an infiltration treatment; d. at last, performing a tempering treatment. As another example, CN104388952A discloses a method for accelerating diffusion and infiltration of a Dy/Tb adhesive layer on the surface of a sintered NdFeB magnet, comprising the steps of: firstly, cleaning the surface of the NdFeB magnet, and adhering a Dy/Tb element on the surface of the cleaned NdFeB magnet through immersion; then performing heat treatment under a high pressure to make a rapid infiltration of the Dy/Tb element in a grain boundary of the magnet; and then performing heat treatment at a middle temperature so that boundary structures of the magnet are further improved, and ultimately obtaining the NdFeB magnet with high coercive force.

At present, an electroplating method is another commonly used method for coating the magnet. For example, CN103839670A discloses a magnet preparation method for improving coercive force of a sintered NdFeB permanent magnet, comprising the steps of: a) using a vacuum fast-setting technology to prepare a blank of an NdFeB alloy magnetic material; b) performing the following treatments on the blank in sequence: chamfering-rinsing-washing-surface modification-washing; c) electroplating the treated permanent magnet with a nickel/heavy rare earth composite coating; and d) placing the sintered NdFeB magnetic material in a vacuum heat treatment furnace for heat treatment.

At present, a manual atomizing spraying method is another commonly used method for coating the magnet. For example, CN104134528A discloses a method for improving magnetic properties of a sintered NdFeB flake magnet, comprising the steps of: spraying a suspension solution having heavy rare-earth elements and having viscosity of 0.1 to 500 mPa·s under normal temperature and pressure on a surface of the sintered NdFeB flaky magnet, and then baking the sintered NdFeB flaky magnet so that a coating layer with heavy rare-earth elements is obtained on the surface of the sintered NdFeB flaky magnet; and performing diffusion treatment and aging treatment on the baked NdFeB flaky magnet under inert gas atmosphere.

The above-mentioned methods have following disadvantages: (1) the thickness of the coating layer is not uniform; (2) working efficiency is low; (3) the powder of Dysprosium fluoride and Terbium fluoride is wasted seriously. Therefore, there is an urgent need for a spraying device which can meet the requirements of coating uniformly and saving spraying raw material.

SUMMARY OF THE INVENTION

In order to overcome the defects of the prior art, the present inventors have investigated a spraying device and use thereof.

An object of the present invention is to provide a spraying device which can meet the requirements of coating uniformly and saving spraying raw material.

Another object of the present invention is to provide a use of the above-mentioned spraying device which is used for surface treatment of a magnet.

A spraying device provided by the present invention comprises:

a conveyer comprising a mesh crawler belt configured to carry an object to be sprayed;

a baking chamber for heating the object to be sprayed;

a spraying chamber inside of which is disposed at least one atomizing nozzle, said at least one atomizing nozzle being configured to uniformly spray a coating solution on a surface of the object to be sprayed;

a cleaning chamber for cleaning the mesh crawler belt and recycling the coating solution carried by the mesh crawler belt; and a solution storage apparatus for storing the coating solution that the spraying chamber needs for spraying;

wherein the mesh crawler belt passes successively through the baking chamber, the spraying chamber and the cleaning chamber.

According to the spraying device of the present invention, preferably, at least four atomizing nozzles are disposed within the spraying chamber, the atomizing nozzles being configured to spray all surfaces of the object to be sprayed.

According to the spraying device of the present invention, preferably, the spraying chamber further comprises a spraying chamber casing, a hollow shaft, an exhaust outlet and a cleaner outlet; the hollow shaft which is freely movably mounted on the spraying chamber casing is configured to transport the coating solution; the exhaust outlet provided at a top part of the spraying chamber casing is configured to remove a coating solution which is not adhered to the object to be sprayed; and the cleaner outlet provided at a bottom part of the spraying chamber casing is configured to discharge a cleaning solution formed in the spraying chamber; and said at least four atomizing nozzles comprise at least two rotary siphon atomizing nozzles that are configured to spray an upper surface, a lower surface, a front surface and a rear surface of the object to be sprayed; said at least two rotary siphon atomizing nozzles are mounted on the hollow shaft; one part of said at least two rotary siphon atomizing nozzles being located above the mesh crawler belt and the other part being located below the mesh crawler belt; said at least four atomizing nozzles further comprise at least two fixed siphon atomizing nozzles respectively mounted on side walls of the spraying chamber, and said at least two fixed siphon atomizing nozzles are configured to spray two side surfaces of the object to be sprayed.

According to the spraying device of the present invention, preferably, said at least two rotary siphon atomizing nozzles are arranged so that they can rotate 360 degrees with the hollow shaft and can move back and forth with the hollow shaft; and an angle between the at least two rotary siphon atomizing nozzles and a travel direction of the mesh crawler belt is 30 degrees to 60 degrees.

According to the spraying device of the present invention, preferably, the mesh crawler belt has meshes woven by an anti-corrosion metal wire, the mesh is in shape of rhombus, the side length of which is one-sixth to one-fifth of a shortest side length of a bottom face of the object to be sprayed; the cross section of the anti-corrosion metal wire is in a circular shape with a diameter of 0.4 mm to 0.6 mm; and the mesh crawler belt presents a concave arc shape, so as to ensure that the number of contact points between the mesh crawler belt and two side edges of the bottom face of the object to be sprayed is 12 or less.

According to the spraying device of the present invention, preferably, the spraying device further comprises a suction fan, the suction fan is provided on a pipeline between the exhaust outlet of the spraying chamber and the solution storage apparatus and is configured to suck the coating solution which is not adhered to the object to be sprayed into the solution storage apparatus through the exhaust outlet.

According to the spraying device of the present invention, preferably, the conveyer further comprises a large guide wheel and a small guide wheel; wherein the large guide wheel is configured to provide power for the movement of the mesh crawler belt, the small guide wheel provided below the mesh crawler belt is configured to support the mesh crawler belt; and each of the large guide wheel and the small guide wheel is in a shape of cylinder having unequal diameters which has greater diameters at both ends than that in center and has an inner arc shaped generatrix.

According to the spraying device of the present invention, preferably, the cleaning chamber comprises a cleaning chamber casing, a shower nozzle and a circulating discharge outlet; the shower nozzle provided at a top part of the cleaning chamber casing is configured to wash the solidified material of the coating solution remained on the mesh crawler belt by using a cleaning solution; and the circulating discharge outlet provided at a bottom part of the cleaning chamber casing is configured to circulate the cleaning solution to the shower nozzle.

According to the spraying device of the present invention, preferably, the baking chamber comprises a baking chamber casing, a thermal insulation layer and a heating plate; an inner wall of the baking chamber casing is provided with the thermal insulation layer; the heating plate and a temperature sensor, provided within the baking chamber, are configured to heat the object to be sprayed to a fixed temperature.

The present invention also provides the use of the above-mentioned spraying device, which is used for surface treatment of the object to be sprayed, wherein the object to be sprayed being a magnet.

The spraying device of the present invention adopts the way of spraying after baking. Heat of the magnet itself can make a coating solution solidify rapidly on a surface of the magnet, so as to prevent the coating solution flowing and accumulating on the surface of the magnet, and thereby the uniformity of spraying is improved. In the meantime, the coating solution reduces the temperature of the magnet to normal temperature. Therefore a cooling process is omitted and working efficiency is improved. According to a preferred technical solution of the present invention, a plurality of atomizing nozzles are used for omnidirectional automatic spraying, so as to ensure consistency of spraying time and consistency of spraying location and further ensure uniformity of thickness of the coating layer. According to a preferred technical solution of the present invention, a spraying chamber recycles the atomized coating solution and the cleaning chamber recycles the coating solution on the mesh crawler belt, thereby saving the material.

Figure 1:
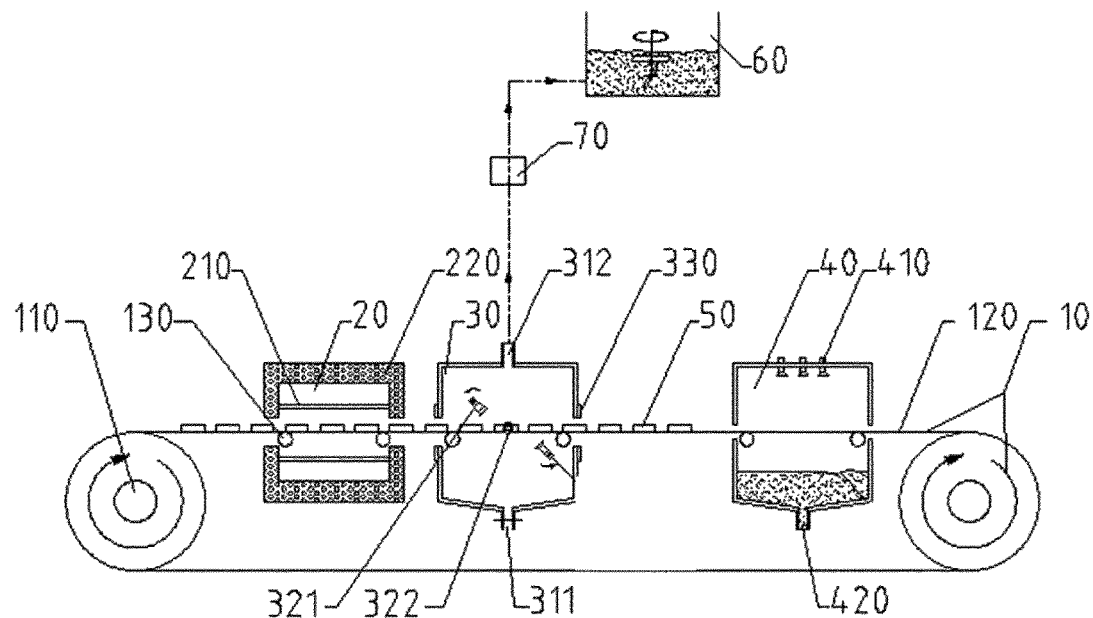
FIG. 1 illustrates a schematic sectional view of a spraying machine according to an embodiment of the present invention.

Description of reference numerals is as follow:

10. conveyer; 110. large guide wheel; 120. metal mesh crawler belt; 130. small guide wheel; 20. baking chamber; 210. heating plate; 220. thermal insulation layer; 30. spraying chamber; 310. spraying chamber casing; 311. cleaner outlet; 312. exhaust outlet; 321. rotary siphon atomizing nozzle; 322. fixed siphon atomizing nozzle; 330. switch unit; 340. hollow shaft; 40. cleaning chamber; 410. shower nozzle; 420. circulating discharge outlet; 50. magnet; 60. solution pool; 70. suction fan.

DETAILED DESCRIPTION OF EMBODIMENTS

The invention will be further described hereinafter with reference to the accompanying drawings and exemplary embodiments, but the scope of protection of the invention is not limited to this.

The term "device" described in the present invention is a product, i.e., that is a systematic collection of individual apparatus. The word "at least" in the present invention includes the number itself. The words "above", "below", or the like words indicating relative positions described in the present invention, e.g., "above" or "below" merely represents that the relative position is identified as "above" or "below". It may be directly provided "above" or "below", or be indirectly (i.e., not adjacently) provided "above" or "below". For example, that a B layer is provided above an A layer just means that the B layer is over the A layer, and they may be adjacent or not, without any limitation. Description of each face of an object to be sprayed in the present invention takes a conveying direction as a reference front face. "Solution" described in the present invention is a dispersion, which may be a transparent solution, a suspension solution or a colloidal solution.

<Spraying Device and Use>

A spraying device of the present invention may be a continuous spraying device, preferably a continuous spraying device with a self-cleaning function, and more preferably a self-cleaning continuous spraying device for coating a neodymium-iron-boron (NdFeB) permanent magnet with heavy rare-earth fluoride before infiltration of Dysprosium or Terbium on the permanent magnet at high temperature. As an example, the spraying device of the present invention is a spraying machine, preferably a continuous spraying machine, and more preferably a self-cleaning continuous spraying machine.

The spraying device of the present invention may be used for surface treatment of an object to be sprayed. The object to be sprayed in the present invention includes but not limited to a magnet, a metallic object, a non-metallic object. The object to be sprayed is preferably the magnet, and more preferably the NdFeB permanent magnet. A coating solution of the present invention can include but not limited to a heavy rare-earth fluoride dispersion, a heavy rare-earth oxide dispersion. Specific examples include Dysprosium fluoride, Terbium fluoride, etc. A dispersion medium of the coating solution is preferably a volatile inorganic solvent or a volatile organic solvent. A specific example includes but not limited to alcohol.

The spraying device of the present invention includes a conveyer, a baking chamber, a spraying chamber, a cleaning chamber and a solution storage apparatus. Preferably, the spraying device can also include a suction fan.

In the present invention, the conveyer is configured to transport an object to be sprayed; the baking chamber is configured to heat the object to be sprayed; a spraying chamber has at least one internally disposed atomizing nozzle which is configured to uniformly spray a coating solution on a surface of the object to be sprayed; a cleaning chamber is configured to clean a mesh crawler belt and recycle the coating solution carried by the mesh crawler belt; and the solution storage apparatus is configured to store the coating solution that the spraying chamber needs for spraying. The conveyer of the present invention includes the mesh crawler belt configured to carry the object to be sprayed, and the mesh crawler belt passes successively through the baking chamber, the spraying chamber and the cleaning chamber, thus carrying the object to be sprayed successively through the baking chamber and the spraying chamber. According to a preferred embodiment, the suction fan of the present invention is provided on a pipeline between the spraying chamber and the solution storage apparatus, and is configured to suck the coating solution which is not adhered to the object to be sprayed into the solution storage apparatus.

<Conveyer>

The conveyer of the present invention is configured to transport the object to be sprayed. The conveyer of the present invention includes the mesh crawler belt, a large guide wheel and a small guide wheel. The large guide wheel is configured to provide power for the movement of the mesh crawler belt. The mesh crawler belt moves forward along with rotation of the large guide wheel, and the object to be sprayed that is carried by the mesh crawler belt passes successively through the baking chamber and the spraying chamber. The small guide wheel is provided below the mesh crawler belt and is configured to support the mesh crawler belt, which can avoid deformation of the mesh crawler belt under an action of gravity of the object to be sprayed, so as to guarantee spraying stability. Both the large guide wheel and the small guide wheel of the present invention may be in shape of cylinder having unequal diameters which has greater diameters at both ends than that in center, and has an inner arc shaped generatrixes. In the present invention, the large guide wheel and the small guide wheel may adopt any kind of anti-corrosion material, such as stainless steel.

The mesh crawler belt of the present invention may have meshes woven by an anti-corrosion metal wire. The mesh may be in shape of rhombus. The anti-corrosion metal wire of the present invention can be the commonly used ones, preferably a stainless steel wire. A side length of the mesh of the present invention may be one-sixth to one-fifth of a shortest side length of a bottom face of the object to be sprayed. A cross section of the anti-corrosion metal wire of the present invention is preferably in a circular shape (the circular shape includes a perfect circle, an Ellipse, etc.). A diameter of the cross section is 0.4 mm to 0.6 mm, preferably 0.45 mm to 0.55 mm. Because both the large guide wheel and the small guide wheel of the present invention are in a shape of cylinder having unequal diameters which has inner arc shaped generatrixes, the mesh crawler belt of the present invention presents a concave arc shape, thus ensuring that the number of contact points between the mesh crawler belt and two side edges of the bottom face of the object to be sprayed is as few as possible, such as 12 or less, and more preferably 10 to 12. It can avoid generation of points without being sprayed, so as to guarantee spraying uniformity.

<Baking Chamber>

A baking chamber of the present invention is configured to dry the object to be sprayed and to heat it to a fixed temperature before it is sprayed. The baking chamber of the present invention includes a baking chamber casing, a thermal insulation layer and a heating plate. An inner wall of the baking chamber casing is provided with the thermal insulation layer, and the heating plate and a temperature sensor, provided within the baking chamber, are configured to heat the object to be sprayed to the fixed temperature. The conveyer transports the object to be sprayed to the baking chamber, in which drying and heating treatment is conducted. The heating plate of the present invention is preferably an electric heating plate, and the heating power may be adjusted freely. The thermal insulation layer of the present invention is configured to maintain a temperature within the baking chamber. High-temperature resistant mullite may be an example of material of the thermal insulation layer. The temperature sensor is provided within the baking chamber. The temperature of the object to be sprayed is controlled by adjusting the temperature of the heating plate.

<Spraying Chamber>

The spraying chamber of the present invention can include a spraying chamber casing, a hollow shaft, an atomizing nozzle, an exhaust outlet and a cleaner outlet.

The hollow shaft which is freely movably mounted on the spraying chamber casing is configured to transport the coating solution. Preferably, the hollow shaft can rotate 360 degrees and move forwards and backwards.

The atomizing nozzle of the present invention, configured to uniformly spray a coating solution on a surface of the object to be sprayed, is provided within the spraying chamber and surrounded by the spraying chamber casing. There is at least one atomizing nozzle, preferably at least four atomizing nozzles, and more preferably at least six atomizing nozzles in the present invention. In this way, all surfaces of the object to be sprayed may be sprayed. Preferably, in the present invention, there are six atomizing nozzles configured to spray an upper surface, a lower surface, a front surface, a rear surface, a left side surface and a right side surface. In the present invention, two atomizing nozzles may also be replaced with one atomizing nozzle. As an equivalent variant, there are four atomizing nozzles configured to spray the upper surface and the rear surface, the lower surface and the front surface, the left side surface, and the right side surface, respectively. As another equivalent variant, there are four atomizing nozzles configured to spray the upper surface and the front surface, the lower surface and the rear surface, the left side surface, and the right side surface, respectively. A normal atomizing nozzle, preferably a siphon atomizing nozzle, may be used in the present invention.

In the present invention, the atomizing nozzles preferably include at least two rotary siphon atomizing nozzles (i.e., a siphon atomizing nozzle that can rotate freely) configured to spray the upper surface, the lower surface, the front surface and the rear surface of the object to be sprayed. Said at least two rotary siphon atomizing nozzles mentioned above, mounted on the hollow shaft, can rotate 360 degrees with the hollow shaft and can move back and forth with the hollow shaft, thus ensuring that the spraying time is consistent and the spraying location is consistent, so as to ensuring the uniformity of the spraying thickness, and thus generation of points without being sprayed is avoided. In the above-mentioned at least two rotary siphon atomizing nozzles, one part (such as two) of the rotary siphon atomizing nozzles may be located above the mesh crawler belt and the other part (such as two) may be located below the mesh crawler belt. In the invention, an angle between the above-mentioned at least two rotary siphon atomizing nozzles and a travel direction of the mesh crawler belt (i.e., a direction for transporting the object to be sprayed) is 30 degrees to 60 degrees, preferably 40 degrees to 50 degrees, and more preferably a 45 degree, thus ensuring uniformity of spraying thickness. In the present invention, the atomizing nozzles preferably further include at least two fixed siphon atomizing nozzles respectively mounted on side walls (a left side wall and a right side wall) of the spraying chamber, said at least two fixed siphon atomizing nozzles being configured to spray two side surfaces (a left side surface and a right side surface) of the object to be sprayed.

The exhaust outlet of the present invention, which may be provided at a top part of the spraying chamber casing, is configured to remove a coating solution which is not adhered to the object to be sprayed. Preferably, the exhaust outlet of the present invention may be provided in a middle position of the top part of the spraying chamber casing. In the present invention, the exhaust outlet connects with the solution storage apparatus through a pipeline. A suction fan of the present invention is provided on the pipeline between the exhaust outlet of the spraying chamber and the solution storage apparatus. In this way, the coating solution which is not adhered to the object to be sprayed is sucked into the solution storage apparatus through the exhaust outlet, so that the cleaning solution can be recycled to avoid wasting of the spraying material.

The cleaner outlet of the present invention, provided at a bottom part of the spraying chamber casing, is configured to discharge a cleaning solution formed in the spraying chamber. The spraying chamber of the present invention also includes an inlet for the object to be sprayed and an outlet for the object to be sprayed, which are provided in a middle part of the spraying chamber casing. The inlet of the object to be sprayed and the outlet of the object to be sprayed have a switch unit mounted thereon, respectively. When spraying, the switch unit is open, so that the object to be sprayed can smoothly pass through the spraying chamber. When cleaning, the switch unit is closed to avoid the situation that the cleaning solution is sprayed out of the spraying chamber by a rotating nozzle.

<Cleaning Chamber>

The cleaning chamber of the present invention includes a cleaning chamber casing, a shower nozzle and a circulating discharge outlet. The shower nozzle provided at a top part of the cleaning chamber casing is configured to use a cleaning solution to wash the solidified material of the solution remained on the mesh crawler belt. The cleaning solution of the present invention is a kind of liquid that can be able to remove the solidified material of the solution remained on the mesh crawler belt, including but not limited to alcohol, such as 95% alcohol, 99% alcohol. Preferably, the cleaning chamber of the present invention includes a plurality of shower nozzles which are arranged in equidistance along a direction of a diagonal line. The number of the shower nozzles may be 2 to 8, preferably 3 to 6. According to a preferred embodiment of the present invention, the cleaning chamber of the invention includes three shower nozzles that are arranged in equidistance along the direction of the diagonal line. The bottom part of the cleaning chamber is designed as a structure that can be opened, which is convenient for recycling the solidified material of the solution on the bottom part of the cleaning chamber.

The circulating discharge outlet of the present invention provided at a bottom part of the cleaning chamber casing is configured to circulate the cleaning solution to the shower nozzle. The circulating discharge outlet of the present invention may be communicated with the shower nozzle through a circulating pump. The circulating pump pumps the cleaning solution from the circulating discharge outlet to the shower nozzle, and then the cleaning solution flows into the cleaning chamber again, so that the cleaning solution is recycled.

<Solution Storage Apparatus>

The solution storage apparatus of the present invention is configured to store the coating solution that the spraying chamber needs for spraying. Examples of the solution storage apparatus include a solution pool, a solution tank, etc. Preferably, within the solution storage apparatus of the present invention, a stirring apparatus for continuously stirring the coating solution is disposed, so as to avoid flocculation or precipitation of the coating solution. The solution storage apparatus is communicated with the hollow shaft of the spraying chamber through a pipeline, so that the coating solution is transported from the solution storage apparatus to the hollow shaft, and then is sprayed out from the rotary siphon atomizing nozzle. The solution storage apparatus is communicated with the fixed siphon atomizing nozzle of the spraying chamber through a pipeline, so that the coating solution is transported from the solution storage apparatus to the fixed siphon atomizing nozzle. The solution storage apparatus is also communicated with the exhaust outlet of the spraying chamber through a pipeline (a suction fan is provided on the pipeline between the solution storage apparatus and the exhaust outlet of the spraying chamber), which is used to collect an atomized coating solution which is not adhered to the object to be sprayed.

Embodiments

Exemplary description of the present invention is hereinafter given with reference to the accompanying drawings, but the present invention is not limited thereto. In the accompanying drawings of the present invention, identical reference numerals are used to represent identical or functionally similar elements.

FIG. 1 illustrates a schematic sectional view of a spraying machine according to an embodiment of the present invention. The spraying machine of the present invention includes a conveyer 10, a baking chamber 20, a spraying chamber 30, a cleaning chamber 40 and a solution pool 60.

The conveyer 10 mainly consists of a large guide wheel 110, a small guide wheel 130 and a metal mesh crawler belt 120. Both the large guide wheel 110 and the small guide wheel 130 are in a shape of cylinder having unequal diameters whose diameters at both ends are greater than that in center and whose generatrixes are inner arc shaped. (see FIG. 2, FIG. 3 and FIG. 4). The large guide wheel 110 and the small guide wheel 130 are made of stainless steel. The metal mesh crawler belt 120 has meshes woven by an anti-corrosion metal wire (see FIG. 5). The metal wire, made of stainless steel, has a circular cross section with a diameter of 0.5 mm. The mesh is in shape of rhombus (i.e., diamond or perfect rhombus), whose side length is one-fifth of a shortest side length of a face having a largest area of a magnet 50 (the object to be sprayed). The metal mesh crawler belt 120 presents a concave arc shape with the inner arc generatrix of the large guide wheel 110 and the small guide wheel 130, so as to ensure that the metal mesh crawler belt 120 only contacts with 10 to 12 points of two side edges of the bottom face of the magnet 50 (see FIG. 6). The conveyer 10, carrying the magnet 50, passes successively through each process chamber, to complete each process.

As shown in FIG. 1, the baking chamber 20 mainly consists of the baking chamber casing, a thermal insulation layer 220 and a heating plate 210. The heating plate 210 adopts an electric heating way, and heating power can be adjusted. An inner wall of the baking chamber is covered with the thermal insulation layer 220 of which the material is high-temperature resistant mullite. A temperature sensor (not shown) is mounted inside the baking chamber 20. The magnet 50 is dried in the baking chamber 20 and is heated to a fixed temperature before being sprayed.

Figure 2:
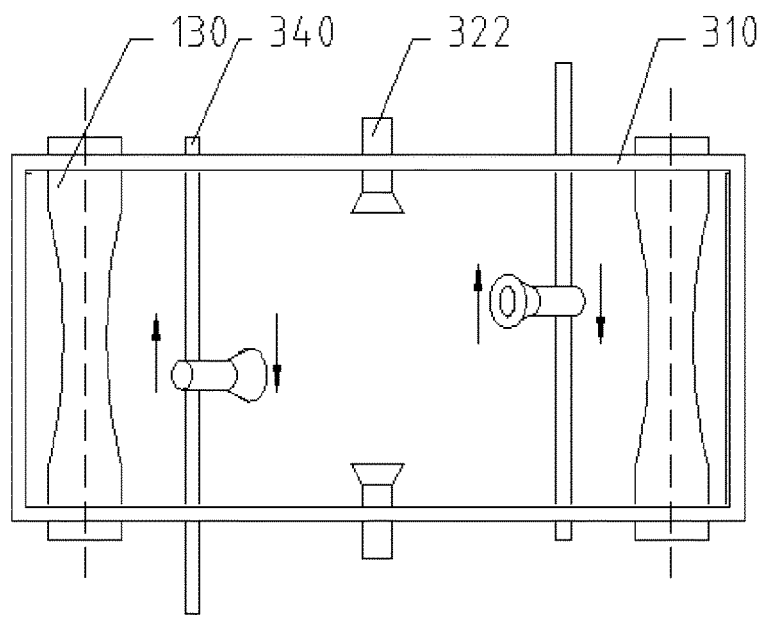
FIG. 2 illustrates a schematic bottom view of a spraying chamber of a spraying machine according to an embodiment of the present invention.

As shown in FIG. 1 and FIG. 2, a spraying chamber 30 mainly consists of a spraying chamber casing 310, a hollow shaft 340, a rotary siphon atomizing nozzle 321, a fixed siphon atomizing nozzle 322, an exhaust outlet 312 and a cleaner outlet 311. The hollow shaft 340 is freely movably mounted on the spraying chamber casing 310. Six siphon atomizing nozzles, provided within the spraying chamber 30, include four rotary siphon atomizing nozzles 321 and two fixed siphon atomizing nozzles 322 (Note: Only two rotary siphon atomizing nozzles are shown in FIG. 2, and the other two are omitted). Said two fixed siphon atomizing nozzles, respectively mounted on the side walls of the spraying chamber 30, are configured to spray two side surfaces (a left side surface and a right side surface) of the magnet 50. Said four rotary siphon atomizing nozzles 321 are mounted on the hollow shaft 340, wherein two of them are located above the metal mesh crawler belt 120 and the other two are located below the metal mesh crawler belt 120. These rotary siphon atomizing nozzles 321 are configured to spray the upper and lower surfaces and the front and rear surfaces of the magnet 50 (the conveying direction is taken as the reference front face). Said four rotary siphon atomizing nozzles 321 can rotate 360 degrees with the hollow shaft 340, and can move back and forth with the hollow shaft 340. The hollow shaft 340 transports the coating solution for said four rotary siphon atomizing nozzles 321 and drives the four rotary siphon atomizing nozzles 321 to rotate and move back and forth. When spraying, said four rotary siphon atomizing nozzles 321 are at an angle of 45 degrees to the travel direction of the metal mesh crawler belt 120 (the upper and lower surfaces of the magnet 50) and move back and forth with the hollow shaft 340, and the moving distance can be adjusted. When cleaning, said four rotary siphon atomizing nozzles 321 rotates 360 degrees with the hollow shaft 340 and moves back and forth with the hollow shaft 340, the moving distance being a maximum limit distance. The spraying chamber 30 also includes an inlet for the magnet and an outlet for the magnet, and the inlet for the magnet, as well as the outlet for the magnet, has a switch unit 330 mounted thereon. When spraying, the switch unit 330 is open; when cleaning, the switch unit 330 is closed, so as to avoid the possibility that the cleaning solution is sprayed out of the spraying chamber 30 from the inlet for the magnet and the outlet for the magnet by the rotary nozzles. The spraying chamber 30 has the exhaust outlet 312 mounted at the top part thereof, and the exhaust outlet is communicated with the solution pool 60 through a suction fan 70 (such as a high-pressure suction fan). When spraying, the suction fan 70 sucks the atomized coating solution which is not adhered to the magnet 50 into the coating solution of the solution pool 60 through the exhaust outlet 312. The cleaner outlet 311, provided at a bottom part of the spraying chamber casing 310, is configured to discharge the cleaning solution formed in cleaning the spraying chamber 30.

Figure 3:
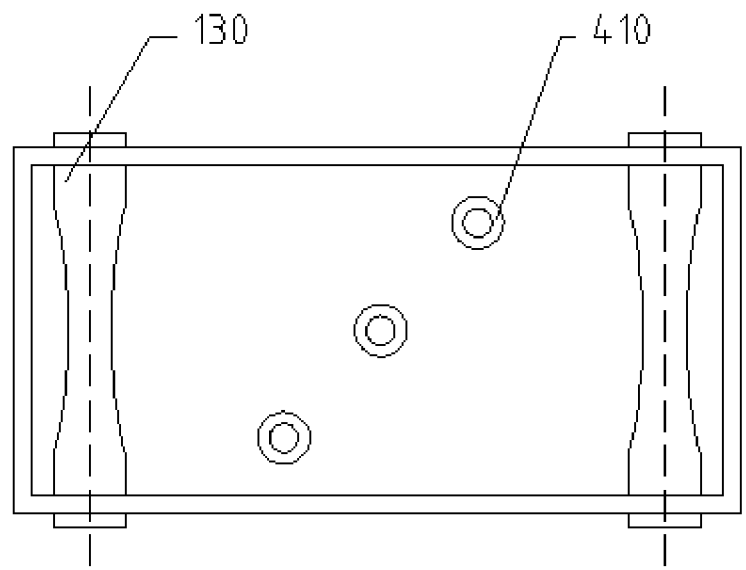
FIG. 3 illustrates a schematic top view of a cleaning chamber of a spraying machine according to an embodiment of the present invention.
Figure 4:
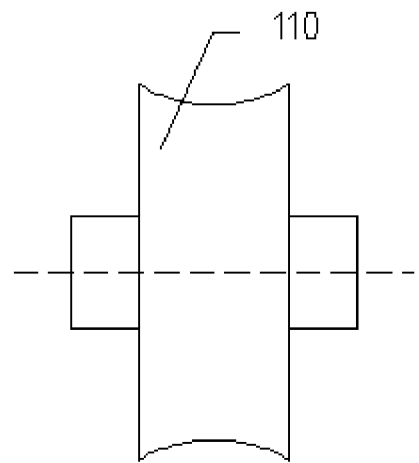
FIG. 4 illustrates a schematic right view of a large guide wheel of a spraying machine according to an embodiment of the present invention.

As shown in FIG. 1 and FIG. 3, a cleaning chamber 40 mainly consists of a cleaning chamber casing, shower nozzles 410 and a circulating discharge outlet 420. There are three shower nozzles 410, which are mounted on a top wall of the cleaning chamber 40, arranged in equidistance along a direction of a diagonal line, and configured to wash the solidified material of the solution remained on the metal mesh crawler belt 120 (see FIG. 3). The bottom part of the cleaning chamber 40 can be opened, which is convenient for recycling the solidified material of the solution on the bottom part of the cleaning chamber. The cleaning chamber 40 is communicated with the circulating pump through a circulating discharge outlet 420. The circulating pump pumps the cleaning solution from the circulating discharge outlet 420 to the shower nozzles 410, and then the cleaning solution flows into the cleaning chamber 40 again, so that the cleaning solution is recycled.

As shown in FIG. 1, a solution pool 60 is configured to store the coating solution that the spraying chamber 30 needs for spraying; a stirring apparatus is provided within the solution pool 60, so as to continuously stirring the coating solution. The solution pool 60 is communicated with the hollow shaft 340 of the spraying chamber 30 through a pipeline, so that the coating solution is transported from the solution pool 60 to the hollow shaft 340 and then is sprayed out from the rotary siphon atomizing nozzles 321. The solution pool 60 is communicated with the fixed siphon atomizing nozzles 322 of the spraying chamber 30 through a pipeline, so that the coating solution is transported from the solution pool 60 to the fixed siphon atomizing nozzles 322.

In the following, taking a coating with Dysprosium fluoride as an example, a work flow of the spraying machine of the present invention is illustrated in detail.

Before placing the magnet 50, make a good preparation work in advance as follows: adding 10 liters of the coating solution (an alcohol dispersion containing ultrafine powder of Dysprosium fluoride) into the solution pool 60, starting the stirring apparatus and continuously stirring the coating solution; adding 5 liters of alcohol into the cleaning chamber 40; starting a power mechanism of the large guide wheel 110, so that the large guide wheel 110 begins to rotate and drive the metal mesh crawler belt 120 to move circularly in each process chamber at a speed of 1.5 meters per minute; starting the heating plate 210 of the baking chamber 20, and starting heat preservation when the temperature in the baking chamber 20 being heated up to 300 degrees Celsius; opening the exhaust outlet 312 and the suction fan 70 above the spraying chamber 30; opening the siphon atomizing nozzles inside the spraying chamber 30, the coating solution in the solution pool 60 entering into the siphon atomizing nozzles through the pipeline and being atomized and sprayed on the metal mesh crawler belt 120 on the move, and four rotary siphon atomizing nozzles 321 above and below the metal mesh crawler belt 120 being at an angle of 45 degrees to the upper or lower surfaces of the magnet 50 and moving back and forth with the hollow shaft 340; and opening the shower nozzle 410 inside the cleaning chamber 40, the alcohol in the cleaning chamber 40 entering into the shower nozzle 410 through the circulating discharge outlet 420 and being circularly sprayed on the metal mesh crawler belt 120.

After all the above preparation work is finished, begin to place the magnet 50. The magnets 50 are successively placed at the center of the metal mesh crawler belt 120 in equidistance from a vacancy on the left of the baking chamber 20, and the space between the magnets 50 is 20 centimeters. The longest side edge of the magnet 50 is parallel to the conveying direction. An automatically controlled mechanical hand may be used to place the magnet 50.

The magnet 50 enters into the baking chamber 20, and moves at a constant speed of 1.5 meters per minute through the baking chamber 20 in a heat-preservation state with the temperature of 300 degrees Celsius. Measurements show that the temperature of the magnet 50 is 260 degrees Celsius as the magnet 50 comes out of the baking chamber 20. The magnet 50 then enters into the spraying chamber 30, and moves at a constant speed of 1.5 meters per minute through the spraying chamber 30. In the spraying chamber 30, two rotary siphon atomizing nozzles 321 above the metal mesh crawler belt 120 perform atomizing spraying on the upper surface and the rear surface of the magnet 50 (a moving direction is taken as the reference front face), and two rotary siphon atomizing nozzles 321 below the metal mesh crawler belt 120 perform the atomizing spraying on the lower surface and the front surface of the magnet 50. Two fixed siphon atomizing nozzles 322 fixed on the side wall of the spraying chamber 30 perform the atomizing spraying on the two side surfaces of the magnet 50. During a process of spraying, four rotary siphon atomizing nozzles 321 above and below the metal mesh crawler belt 120 are at an angle of 45 degrees to the upper or lower surfaces of the magnet 50 and move back and forth with the hollow shaft 340. The suction fan 70 sucks the atomized coating solution which is not adhered to the magnet 50 into the solution of the solution pool 60 through the exhaust outlet 312.

Figure 5:
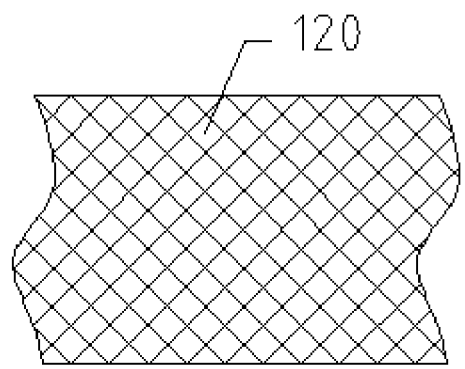
FIG. 5 illustrates a schematic top view of a metal mesh crawler belt of a spraying machine according to an embodiment of the present invention.
Figure 6:
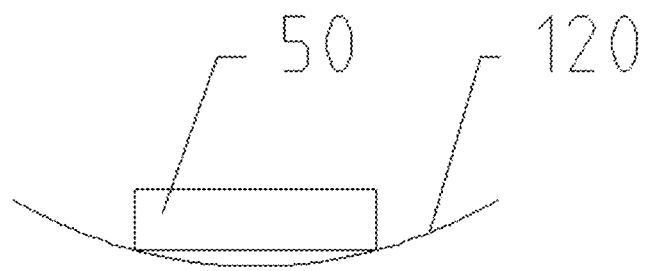
FIG. 6 illustrates a schematic right view of a magnet placed on a metal mesh crawler belt of a spraying machine according to an embodiment of the present invention.

It would be specially pointed out that the metal mesh crawler belt 120 presents the concave arc shape with the inner arc generatrix shape of the large guide wheel 110 and the small guide wheel 130, so the metal mesh crawler belt 120 only contacts with 10 to 12 points of two side edges of the bottom face of the magnet 50, and the rotary siphon atomizing nozzles 321 below the metal mesh crawler belt 120 can smoothly spray the coating solution on the lower surface of the magnet 50 through the mesh (see FIG. 5 and FIG. 6). The temperature of the magnet 50 is at a high temperature of 260 degrees Celsius as the magnet 50 enters the spraying chamber 30, and therefore the alcohol evaporates rapidly after the atomized coating solution is sprayed on the magnet 50, and Dysprosium fluoride solidifies rapidly on the surface of the magnet 50; in the meantime, the magnet 50 is cooled. Measurements show that the temperature of the magnet 50 is 24 to 26 degrees Celsius as the magnet 50 comes out of the spraying chamber 30.

The magnet 50 moves to a taking position after passing through the spraying chamber 30. An automatically controlled mechanical hand performs taking and placing actions to the magnet 50 and makes the magnet 50 leave the metal mesh crawler belt 120.

After the metal mesh crawler belt 120 passing through the spraying chamber 30, a surface of the metal wire of the metal mesh crawler belt 120 is adhered with a layer of Dysprosium fluoride solid. After the metal mesh crawler belt 120 passes through the taking position, the magnet 50 that has been coated is taken away, and the metal mesh crawler belt 120 continues to move and passes through the cleaning chamber 40. In the cleaning chamber 40, the circulating pump pumps the alcohol from the circulating discharge outlet 420 to the three shower nozzles 410, and the alcohol is sprayed on the metal mesh crawler belt 120 to rinse Dysprosium fluoride solid remained on the metal mesh crawler belt 120. The top of the circulating discharge outlet 420 is higher than the bottom of the cleaning chamber 40 and there is no stirring apparatus in the cleaning chamber 40, so that most of Dysprosium fluoride will be precipitated on the bottom part of the cleaning chamber 40, which is ready to be recycled. The cleaned metal mesh crawler belt 120 continues to move and that cycle repeats.

The recycling and cleaning operations are performed after the spraying of all the magnets 50 is finished. The circulating pump of the cleaning chamber 40 is shut off, and all the alcohol in the cleaning chamber 40 is discharged into a specified vessel, so as to precipitate and recycle Dysprosium fluoride doped in the alcohol. The bottom part of the cleaning chamber 40 is opened and Dysprosium fluoride precipitated on the bottom part is recycled. All the siphon atomizing nozzles (the rotary siphon atomizing nozzles 321 and the fixed siphon atomizing nozzles 322) in the spraying chamber 30 stop spraying, the suction fan 70 stops working, the large guide wheel 110 stops rotating, the switch unit 330 of the spraying chamber 30 is turned off, the solution remained in the solution pool 60 is discharged, and the pure alcohol is added into the solution pool 60. All the siphon atomizing nozzles in the spraying chamber 30 are reopened; the atomized alcohol sprayed out from the siphon atomizing nozzles rinses the inner wall of the spraying chamber 30. When cleaning, the four rotary siphon atomizing nozzles 321 rotates 360 degrees with the hollow shaft (340) and moves back and forth with the hollow shaft 340, the moving distance being the maximum limit distance, thereby conducting omnidirectional cleaning of the inner wall of the spraying chamber 30. The cleaner outlet 311 at the bottom part of the spraying chamber 30 is opened, and the used alcohol is discharged into the specified vessel through the cleaner outlet 311, so as to precipitate and recycle Dysprosium fluoride obtained after rinsing the inner wall of the spraying chamber 30.

The present invention is not limited to the above-mentioned embodiments. Any variation, improvement or replacement that can be derived by those skilled in the art without deviating from substance of the present invention shall fall within the protection scope of the present invention.

What is claimed is:

1. A spraying device comprising:
   a conveyer comprising a mesh crawler belt configured to carry an object to be sprayed;
   a baking chamber for heating the object to be sprayed;
   a spraying chamber inside of which is disposed at least four atomizing nozzles, the at least four atomizing nozzles configured to uniformly spray a coating solution on all surfaces of the object to be sprayed;
   a cleaning chamber for cleaning the mesh crawler belt and recycling the coating solution carried by the mesh crawler belt; and
   a solution storage apparatus for storing the coating solution that the spraying chamber needs for spraying;
   wherein the mesh crawler belt passes successively through the baking chamber, the spraying chamber and the cleaning chamber;
   wherein the spraying chamber further comprises a spraying chamber casing, a hollow shaft freely movably mounted on the spraying chamber casing, an exhaust outlet and a cleaner outlet; the hollow shaft configured to transport the coating solution; the exhaust outlet provided at a top part of the spraying chamber casing configured to remove a coating solution which is not adhered to the object to be sprayed; and the cleaner outlet provided at a bottom part of the spraying chamber casing configured to discharge a cleaning solution formed in the spraying chamber; and
   wherein the at least four atomizing nozzles comprise at least two rotary siphon atomizing nozzles that are configured to spray an upper surface, a lower surface, a front surface and a rear surface of the object to be sprayed; the at least two rotary siphon atomizing nozzles mounted on the hollow shaft; one part of the at least two rotary siphon atomizing nozzles located above the mesh crawler belt and another part located below the mesh crawler belt; the at least four atomizing nozzles further comprise at least two fixed siphon atomizing nozzles respectively mounted on side walls of the spraying chamber, and the at least two fixed siphon atomizing nozzles configured to spray two side surfaces of the object to be sprayed.

2. The spraying device according to claim 1, wherein the at least two rotary siphon atomizing nozzles are arranged so that they can rotate 360 degrees with the hollow shaft and can move back and forth with the hollow shaft; and an angle between the at least two rotary siphon atomizing nozzles and a travel direction of the mesh crawler belt is 30 degrees to 60 degrees.

3. The spraying device according to claim 1, wherein the mesh crawler belt has meshes woven by an anti-corrosion metal wire, the mesh having the shape of a rhombus, a side length of which is one-sixth to one-fifth of a shortest side length of a bottom face of the object to be sprayed; a cross section of the anti-corrosion metal wire having a circular shape with a diameter of 0.4 mm to 0.6 mm; and the mesh crawler belt provides a concave arc shape, thereby ensuring that a number of contact points between the mesh crawler belt and two side edges of the bottom face of the object to be sprayed is 12 or less.

4. The spraying device according to claim 1, wherein the spraying device further comprises a suction fan, the suction fan provided on a pipeline between the exhaust outlet of the spraying chamber and the solution storage apparatus and configured to suck the coating solution which is not adhered to the object to be sprayed into the solution storage apparatus through the exhaust outlet.

5. The spraying device according to claim 1, wherein the conveyer further comprises a large guide wheel and a small guide wheel, wherein the large guide wheel is configured to provide power for the movement of the mesh crawler belt, the small guide wheel provided below the mesh crawler belt configured to support the mesh crawler belt, and each of the large guide wheel and the small guide wheel having a shape of a cylinder having unequal diameters which has greater diameters at both ends than that in center, and has an inner arc shaped generatrix.

6. The spraying device according to claim 1, wherein the cleaning chamber comprises a cleaning chamber casing, a shower nozzle and a circulating discharge outlet; the shower nozzle provided at a top part of the cleaning chamber casing configured to use a cleaning solution to wash the solidified material of the solution remained on the mesh crawler belt, and the circulating discharge outlet provided at a bottom part of the cleaning chamber casing configured to circulate the cleaning solution to the shower nozzle.

7. The spraying device according to claim 1, wherein the baking chamber comprises a baking chamber casing, a thermal insulation layer and a heating plate; an inner wall of the baking chamber casing provided with the thermal insulation layer; and the heating plate and a temperature sensor, provided within the baking chamber, are configured to heat the object to be sprayed to a fixed temperature.

8. A use of the spraying device according to claim 1, wherein the spraying device is adapted for surface treatment of the object to be sprayed, wherein the object to be sprayed is a magnet.

* * * * *